US012509037B2

(12) United States Patent
Tione et al.

(10) Patent No.: US 12,509,037 B2
(45) Date of Patent: Dec. 30, 2025

(54) VEHICLE BRAKING ASSEMBLY

(71) Applicant: Faiveley Transport Italia S.P.A., Piossasco (IT)

(72) Inventors: Roberto Tione, Lauriano (IT); Andrea Cavazzin, Turin (IT); Angelo Grasso, Canelli (IT)

(73) Assignee: Faiveley Transport Italia S.P.A., Piossasco (IT)

( * ) Notice: Subject to any disclaimer, the term of this patent is extended or adjusted under 35 U.S.C. 154(b) by 426 days.

(21) Appl. No.: 17/962,988

(22) Filed: Oct. 10, 2022

(65) Prior Publication Data
US 2023/0042019 A1 Feb. 9, 2023

Related U.S. Application Data

(63) Continuation-in-part of application No. 16/725,326, filed on Dec. 23, 2019, now Pat. No. 11,498,541.
(Continued)

(30) Foreign Application Priority Data

Nov. 13, 2014 (IT) .......................... TO2014A000945

(51) Int. Cl.
 *B60T 8/17* (2006.01)
 *B60T 8/174* (2006.01)
 (Continued)

(52) U.S. Cl.
 CPC .............. *B60T 8/174* (2013.01); *B60T 8/366* (2013.01); *G06N 3/04* (2013.01); *G06N 3/08* (2013.01)

(58) Field of Classification Search
 CPC .... B60T 13/261; B60T 13/263; B60T 13/265; B60T 13/36; B60T 13/365; B60T 13/683; B60T 8/174; B60T 8/366
 See application file for complete search history.

(56) References Cited

U.S. PATENT DOCUMENTS 4,546,437 A 10/1985 Bleckmann et al.
4,776,072 A 10/1988 Jacquier
(Continued)

FOREIGN PATENT DOCUMENTS

DE 102005024120 B4 * 7/2009 .............. B60T 13/26
EP 0283050 A2 * 9/1988 .............. B60T 8/885
(Continued)

OTHER PUBLICATIONS

International Search Report dated Feb. 17, 2016 for corresponding PCT Application No. PCT/IB2015/058730.

*Primary Examiner* — Thomas J Williams
(74) *Attorney, Agent, or Firm* — K&L Gates LLP

(57) ABSTRACT

A system including a supply valve disposed between a chamber and a pressure source, a discharge valve disposed between the chamber and an external atmosphere, a first control unit, and a second control unit. The first control unit coupled with the supply valve by a first switch and with the discharge valve by a second switch. The first control unit outputting signals to the first and second switches to control the supply and discharge valves. The second control unit coupled with the discharge valve by a third switch and a fourth switch, the second control unit outputting signals to the third and fourth switches to control the supply and discharge valves. The first control unit may include a first microcontroller to control the signals of the first control unit using an artificial intelligence (AI) neural network having artificial neurons arranged in layers and connected with each other by connections.

20 Claims, 10 Drawing Sheets

Related U.S. Application Data which is a continuation-in-part of application No. 15/524,053, filed as application No. PCT/IB2015/058730 on Nov. 12, 2015, now Pat. No. 10,538,229.

(51) Int. Cl.
*B60T 8/36* (2006.01)
*G06N 3/04* (2023.01)
*G06N 3/08* (2023.01)

(56) References Cited

U.S. PATENT DOCUMENTS

| | | | |
|---|---|---|---|
| 5,001,641 A | 3/1991 | Makino | |
| 5,333,239 A * | 7/1994 | Watanabe | G06N 3/04 |
| | | | 706/25 |
| 5,458,404 A | 10/1995 | Fennel et al. | |
| 5,485,379 A | 1/1996 | Kremer | |
| 5,494,342 A | 2/1996 | Engle | |
| 5,590,042 A | 12/1996 | Allen, Jr. et al. | |
| 5,630,565 A | 5/1997 | Lumbis | |
| 5,681,015 A | 10/1997 | Kull | |
| 5,722,736 A | 3/1998 | Cook | |
| 5,795,039 A | 8/1998 | Fennel et al. | |
| 5,808,370 A | 9/1998 | Bezos | |
| 5,822,742 A * | 10/1998 | Alkon | G06N 3/04 |
| | | | 706/31 |
| 5,887,953 A * | 3/1999 | Wood | B60T 8/1893 |
| | | | 303/7 |
| 5,924,774 A | 7/1999 | Cook et al. | |
| 5,927,823 A | 7/1999 | Dimsa et al. | |
| 5,975,651 A | 11/1999 | Bezos | |
| 5,984,426 A | 11/1999 | Hart | |
| 6,024,419 A | 2/2000 | Waldrop et al. | |
| 6,202,017 B1 * | 3/2001 | Bleckmann | B60T 8/885 |
| | | | 703/1 |
| 6,250,723 B1 | 6/2001 | Barberis et al. | |
| 6,410,993 B1 | 6/2002 | Giers | |
| 6,474,748 B1 | 11/2002 | Cunkelman | |
| 9,751,513 B2 | 9/2017 | Dewberry et al. | |
| 10,486,672 B2 * | 11/2019 | Tione | B60T 15/027 |
| 10,538,229 B2 | 1/2020 | Tione et al. | |
| 2002/0050739 A1 | 5/2002 | Koepff et al. | |
| 2002/0163248 A1 | 11/2002 | Wood et al. | |
| 2002/0175561 A1 * | 11/2002 | Jensen | B60T 13/683 |
| | | | 303/113.1 |
| 2005/0057352 A1 | 3/2005 | Stockhausen | |
| 2005/0099061 A1 | 5/2005 | Hollandsworth et al. | |
| 2007/0063578 A1 | 3/2007 | Reynolds et al. | |
| 2010/0078991 A1 | 4/2010 | Maischak et al. | |
| 2011/0089755 A1 | 4/2011 | Itano et al. | |
| 2011/0316327 A1 * | 12/2011 | Rekow | B60T 8/4809 |
| | | | 303/3 |
| 2012/0192757 A1 | 8/2012 | Schiffers et al. | |
| 2013/0018560 A1 | 1/2013 | Smith et al. | |
| 2013/0221735 A1 | 8/2013 | Kiel et al. | |
| 2013/0261857 A1 | 10/2013 | Matsuyama | |
| 2014/0319904 A1 | 10/2014 | Watanabe et al. | |
| 2014/0345491 A1 | 11/2014 | Scharpf et al. | |
| 2015/0083529 A1 | 3/2015 | Tione | |
| 2017/0169976 A1 | 6/2017 | Kanner et al. | |
| 2018/0297570 A1 * | 10/2018 | Tione | F15B 1/024 |
| 2020/0130668 A1 * | 4/2020 | Tione | B60T 15/021 |
| 2020/0272899 A1 * | 8/2020 | Dunne | G06N 3/08 |
| 2020/0406879 A1 * | 12/2020 | Hecker | B60T 13/683 |
| 2022/0274607 A1 * | 9/2022 | Aslandere | G05B 13/027 |
| 2023/0042019 A1 * | 2/2023 | Tione | G06N 3/08 |

FOREIGN PATENT DOCUMENTS

| | | |
|---|---|---|
| EP | 0283050 B1 | 9/1993 |
| EP | 0958980 A2 | 11/1999 |
| WO | 2013182558 A2 | 12/2013 |

* cited by examiner

VEHICLE BRAKING ASSEMBLY

CROSS-REFERENCE TO RELATED APPLICATIONS

This application is a continuation-in-part of U.S. patent application Ser. No. 16/725,326, filed on 23 Dec. 2019, which is a continuation-in-part of U.S. patent application Ser. No. 15/524,053, filed on 3 May 2017, which is a national stage application, filed under 35 U.S.C. § 371, of International Patent Application No. PCT/IB2015/058730, filed on 12 Nov. 2015, which claims priority to Italian Patent Application No. TO2014A000945, filed on 13 Nov. 2014. The entire disclosures of these applications are incorporated herein by reference.

BACKGROUND

Technical Field

The subject matter described herein relates to braking systems of vehicles.

Discussion of Art

Existing braking systems for railway vehicles may comprise electro-pneumatic assemblies controlled by electronic units of the microprocessor type. The design of these braking systems may be governed by specific standards (in Europe, for example, the EN 50126 standard relating to system definition, the EN 50128 standard concerning software design and development, and the EN 50129 standard relating to hardware specifications and design). These standards introduced the concept of "Safety Integrity Level" (SIL hereafter) which defines the degree of reduction of risk to human safety that can be associated with a given function relating to a braking installation.

A braking installation for railway vehicles may be designed to execute a plurality of functions, for example (but not only) service braking, parking braking, safety braking, emergency braking, braking correction in case of wheel sliding or locking (wheel slide protection), and holding braking.

A different SIL level may be required for each of these functions: in particular, the emergency braking and safety braking functions must be implemented with safety levels in the range from SIL=3 to SIL=4, with reference to a scale running from a minimum of SIL=0 to a maximum of SIL=4.

In the present state of the art, purely mechanical-pneumatic solutions may be used in virtually all cases to execute the emergency braking and safety braking functions, since these solutions enable the requisite SIL levels to be reached and verified in a convenient manner.

FIG. 1 of the attached drawings shows, by way of example, an electro-pneumatic braking installation for vehicles in which the safety braking pressure is determined by a valve 1, commonly known as an LPPV (Load Proportional Pressure Valve). This valve may be used to generate a braking pressure proportional to the detected weight of the railway vehicle (or of a part thereof, for example a bogie), to provide the greatest possible deceleration within the limits of wheel-to-rail adhesion defined at the design stage. The valve, various implementations of which are known, may execute a transfer function of the type shown in qualitative terms in FIG. 2, where the pressure Pi at the input of the valve 1 is shown on the horizontal axis, and the pressure Po at the output of this valve is shown on the vertical axis.

According to FIG. 2, when the pressure Pi varies between a value Ptare and a maximum value Pimax, the output pressure Po may vary between a minimum value Pomin and a maximum value Pomax, along a straight line characterized by a slope angle $\alpha$. Additionally, when the pressure Pi varies between Ptare and 0, the output pressure Po may vary between the value Pomin and an intermediate value P*o, according to a straight line characterized by a slope angle $\beta$. The pressure P*o is such that the vehicle is always braked if a fault occurs in the suspension, such that an excessively low pressure value is caused, as shown in the broken-line continuation of the straight line having the slope $\alpha$.

With reference to FIG. 1 again, the pressure Po at the output of the valve 1 is sent (for example) to the control chamber of a relay valve 2, through one or more solenoid safety valves 3. These solenoid valves 3 are normally in the state of pneumatic conduction when de-energized, and are energized by a safety loop of the braking system. Safety braking is applied by de-energizing the safety loop, the pressure Po from the output of the valve 1 then being propagated by the control chamber of the relay valve 2, which amplifies its power, at its output 2a, towards the brake cylinder or cylinders (not shown).

The known solution described above is one of various possible solutions used to execute a braking function with a safety level equal to or greater than the SIL 3 level defined in the EN 50126 standard.

Although these solutions are satisfactory in terms of the safety level, they have considerable drawbacks due to the complexity and nature of the devices and components used, such as springs, rubber diaphragms, sealing rings, and the like. The use of these components has a negative effect on the accuracy of the functional characteristics provided, and on their repeatability when the operating temperature varies, in view of functional requirements which commonly specify operating temperature ranges from −40° C. to +70° C. Additionally, the provision of operating characteristics such as those shown in FIG. 2 by purely mechanical-pneumatic means requires complicated solutions, such as specific ratios between the rubber diaphragm surfaces and the spring loading, these ratios determining the slope angle $\alpha$, $\beta$ and the points of intersection of the straight lines with this Cartesian axes.

Also, with the known solutions of the purely mechanical-pneumatic type, it is substantially impossible to calibrate the operating characteristics on board a vehicle during the normal adjustment of the vehicle (during commissioning), and therefore, if the slopes $\alpha$, $\beta$ or the pressure values at the points of intersection of the straight lines with the Cartesian axes have to be varied, the ratios between the surfaces of the rubber diaphragms and the spring loadings must be completely re-planned, which will obviously create delays in the adjustment of the vehicle.

Furthermore, the variation of the aforesaid functional characteristics due to the tolerances of the materials and the fluctuations caused by temperature variations and ageing results in a considerable lack of precision in the stopping distances of railway vehicles during emergency and/or safety braking.

It is also known that the use of microprocessor systems for the feedback control of pneumatic solenoid valves enables the characteristic function of the valve 1 described above to be reproduced conveniently, while providing much greater accuracy than that allowed by existing mechanical-pneumatic components, over a range of temperature and time variations, thus making the aforesaid stopping distances much more precise and repeatable. Moreover, certain characteristics such as the slopes α and β can be easily and rapidly modified simply by using software methods to reprogram parameters.

FIG. 3 of the appended drawings shows an embodiment of an electro-pneumatic assembly 10 for controlling the pneumatic pressure in a chamber or volume 11, such as the volume of a brake cylinder, or the control chamber of a relay valve which controls the supply of pressure to the volume of a brake cylinder. This assembly 10 comprises a solenoid supply or filling valve 12 adapted to connect the chamber 11 selectively to a pressure source PS or to the atmosphere, and a vent or discharge valve 13 adapted to allow or selectively prevent the connection of the chamber 11 to the atmosphere. The solenoid valves 12 and 13 are provided with respective control solenoids 12 a, 13 a to which respective electronic switches are coupled in the manner described below.

The chamber or volume 11 is connected to a conduit 14 which connects the output of the solenoid valve 12 to the input of the solenoid valve 13.

When the solenoids 12 a and 13 a of the solenoid valves 12 and 13 are de-energized, these solenoid valves appear in the condition shown in FIG. 3: the volume or chamber 11 is connected to the atmosphere, and the pressure within it is reduced to the value of atmospheric pressure.

When the solenoid valves 12 and 13 are both energized, the first valve supplies the chamber 11 with a flow of air taken from the pressure source, while the second valve disconnects the chamber 11 from the atmosphere. Thus the pressure in the chamber 11 is increased.

When the solenoid valve 12 is de-energized and the solenoid valve 13 is energized, the chamber 11 is disconnected both from the pressure source and from the atmosphere, and the pressure within it remains substantially unchanged.

The behavior of the electro-pneumatic assembly 10 of FIG. 3 with the variation of the conditions of energizing and de-energizing of the solenoids 12 a and 13 a is summarized in Table 1 below.

TABLE 1

| 12a | 13a | Pressure in 11 |
|---|---|---|
| 0 | 0 | DECREASE |
| 0 | 1 | MAINTENANCE |
| 1 | 1 | INCREASE |
| 1 | 0 | — |

0 = de-energized
1 = energized
— = condition not used

By suitably modulating the energizing conditions or states of the solenoid valves 12 and 13 shown in Table 1, it is possible to produce and maintain in the volume or chamber 11 any value of pressure between the pressure PS of the source and atmospheric pressure Patm.

FIGS. 4 and 5 show variant embodiments of the electro-pneumatic assembly 10. In these figures, parts and elements identical or corresponding to those described previously have been given the same reference numerals as those used previously.

The mode of operation of the electro-pneumatic assemblies 10 of FIGS. 4 and 5 can be summarized as shown in Tables 2 and 3 below.

TABLE 2

| 12a | 13a | Pressure in 11 |
|---|---|---|
| 0 | 0 | MAINTENANCE |
| 0 | 1 | DECREASE |
| 1 | 0 | INCREASE |
| 1 | 1 | — |

TABLE 3

| 12a | 13a | Pressure in 11 |
|---|---|---|
| 0 | 0 | INCREASE |
| 1 | 0 | MAINTENANCE |
| 1 | 1 | DECREASE |
| 0 | 1 | — |

Once again, in the case of the electro-pneumatic assemblies 10 of FIGS. 4 and 5, by suitably modulating the energizing conditions or states of the solenoid valves 12 and 13 it is possible to produce and maintain in the volume or chamber 11 any value of pressure between PS and PATM.

FIG. 6 shows, in the form of a block diagram, an electronic control system 15 according to the prior art, for controlling an electro-pneumatic assembly according to one of FIGS. 3 to 5. This system 15 essentially comprises a processing and control unit 16, of the microprocessor or microcontroller type, which receives at an input a signal L containing information on the weight of the vehicle (or of a single bogie of the vehicle), for example the instantaneous value of the pressure Pi shown on the horizontal axis of FIG. 2.

At another input, the unit 16 receives a signal P representing the pneumatic pressure within the volume or chamber 11, detected by means of a suitable sensor. The unit 16 may receive further signals or input data II, which are not essential for the purposes of the present description.

By means of bias circuits 17 and 18, the unit 16 controls corresponding solid-state electronic switches 19 and 20, such as p-channel MOS transistors or simple NPN transistors, which control the energizing/de-energizing condition of the solenoids 12 a and 13 a respectively, in parallel with which respective recirculation diodes 21 and 22 may be connected. In the control system 15 of FIG. 6, the electronic switches 19 and 20 are connected in series with the windings 12 a and 13 a, between a d.c. power source Vcc and the earth GND.

The unit 16 may if necessary supply further output signals OO, relating to other processes not essential for the purposes of the present description.

By implementing suitable closed-loop control algorithms, for example PID algorithms, "fuzzy" algorithms, or algorithms of the on-off type with hysteresis (also known as "bangbang" control algorithms), the unit 16 can be designed to provide the characteristic shown in the diagram of FIG. 2, in such a way that the pressure in the container or volume 11 corresponds to the pressure Po in this diagram. For this purpose, the unit 16 receives, through an input port, the values of a set of parameters PP which characterize the control algorithm. The values of these parameters are stored in a non-volatile memory of the unit 16.

As an alternative to the implementation shown schematically in FIG. 6, the solenoids 12 a and 13 a may be connected to the earth GND, while the associated switches 19 and 20 may be connected to the d.c. power source. In this case, the switches 19 and 20 can be n-channel MOS transistors or PNP transistors.

In view of the EN 50126, EN 50128 and EN 50129 standards, if the function implemented by the unit 16, for example the pressure characteristic according to the diagram of FIG. 2, requires a safety level equivalent to SIL 3 or SIL 4, then, since the unit 16 is the only device contributing to the execution of this safety function, the corresponding software must also be implemented with a process having a safety level of SIL 3 or SIL 4, as specified, in particular, in the EN 50128 standard. However, this software implementation process is characterized by extremely high organizational, financial and maintenance-related costs, which frequently make its use less attractive by comparison with the more conventional mechanical-pneumatic systems, even though these suffer from all the aforementioned drawbacks.

BRIEF DESCRIPTION

In one embodiment, an assembly includes a supply valve configured to be disposed between a chamber and a pressure source, a discharge valve disposed between the chamber and an external atmosphere, and a first control unit coupled with the supply valve by a first switch and with the discharge valve by a second switch. The first control unit is configured to output signals to the first switch and the second switch to control the supply valve and the discharge valve. The assembly also includes a second control unit coupled with the discharge valve by a third switch and a fourth switch. The second control unit is configured to output signals to the third switch and the fourth switch to control the supply valve and the discharge valve. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

In one embodiment, an assembly includes a first control unit coupled with a supply valve by a first switch and with a discharge valve by a second switch. The first control unit is configured to output signals to the first switch and the second switch to control the supply valve and the discharge valve to control a pressure inside a chamber. The assembly also includes a second control unit coupled with the discharge valve by a third switch and a fourth switch. The second control unit is configured to output signals to the third switch and the fourth switch to control the supply valve and the discharge valve. The first control unit and the second control unit are configured to output the signals such that the supply valve and the discharge valve open or close based on whether the signals from the first control unit match or conflict with the signals from the second control unit. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

In one embodiment, an assembly includes a supply valve and a discharge valve coupled in series with each other between a pressure source and an external atmosphere. The supply valve and the discharge valve are configured to be coupled with a chamber that is pressurized by the pressure source. The assembly also includes a first control unit coupled with the supply valve by a first switch and with the discharge valve by a second switch. The first control unit is configured to output signals to the first switch and the second switch to control the supply valve and the discharge valve. The assembly also includes a second control unit coupled with the discharge valve by a third switch and a fourth switch. The second control unit is configured to output signals to the third switch and the fourth switch to control the supply valve and the discharge valve. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
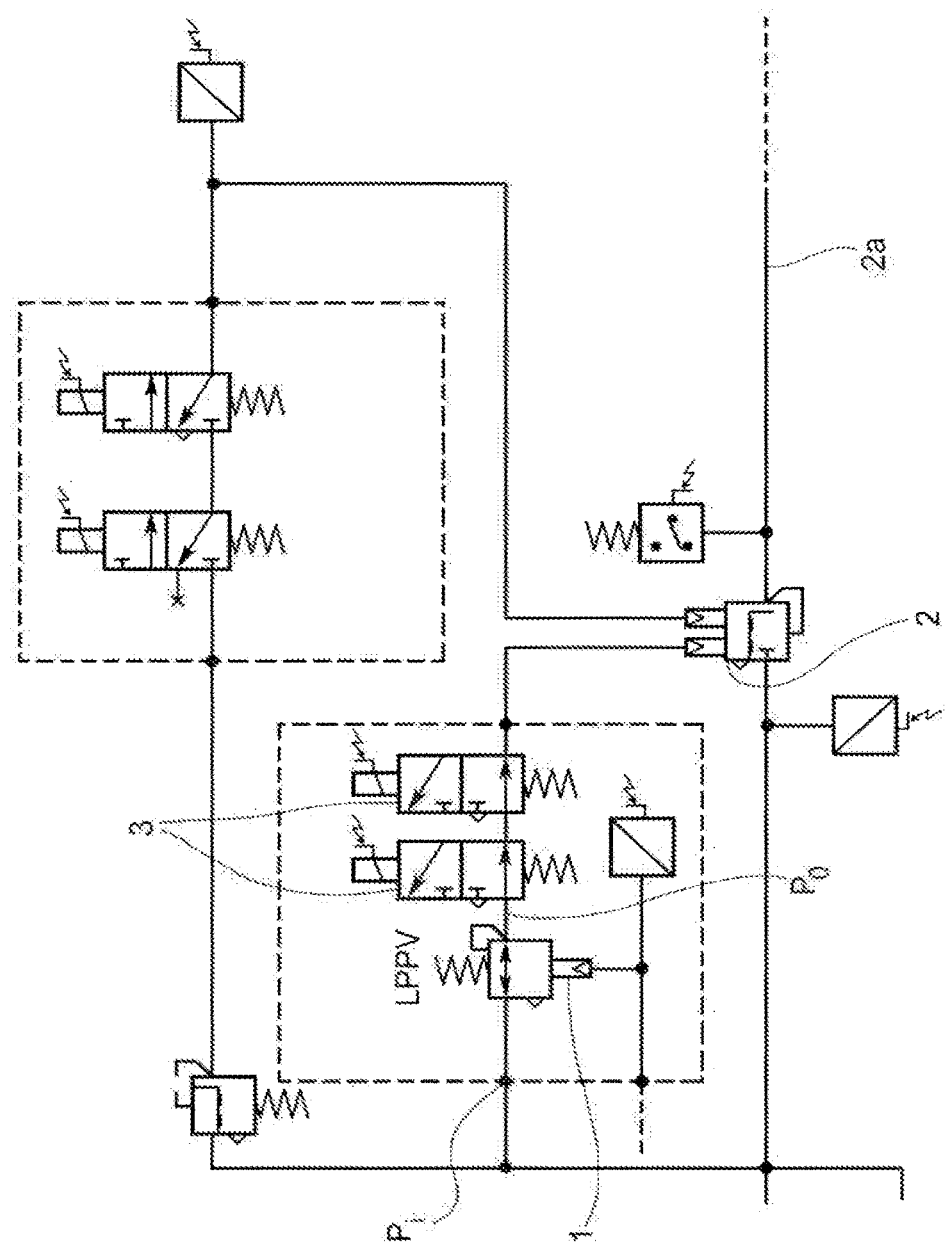
FIG. 1, described above, is a diagram of a braking system for vehicles.
Figure 2:
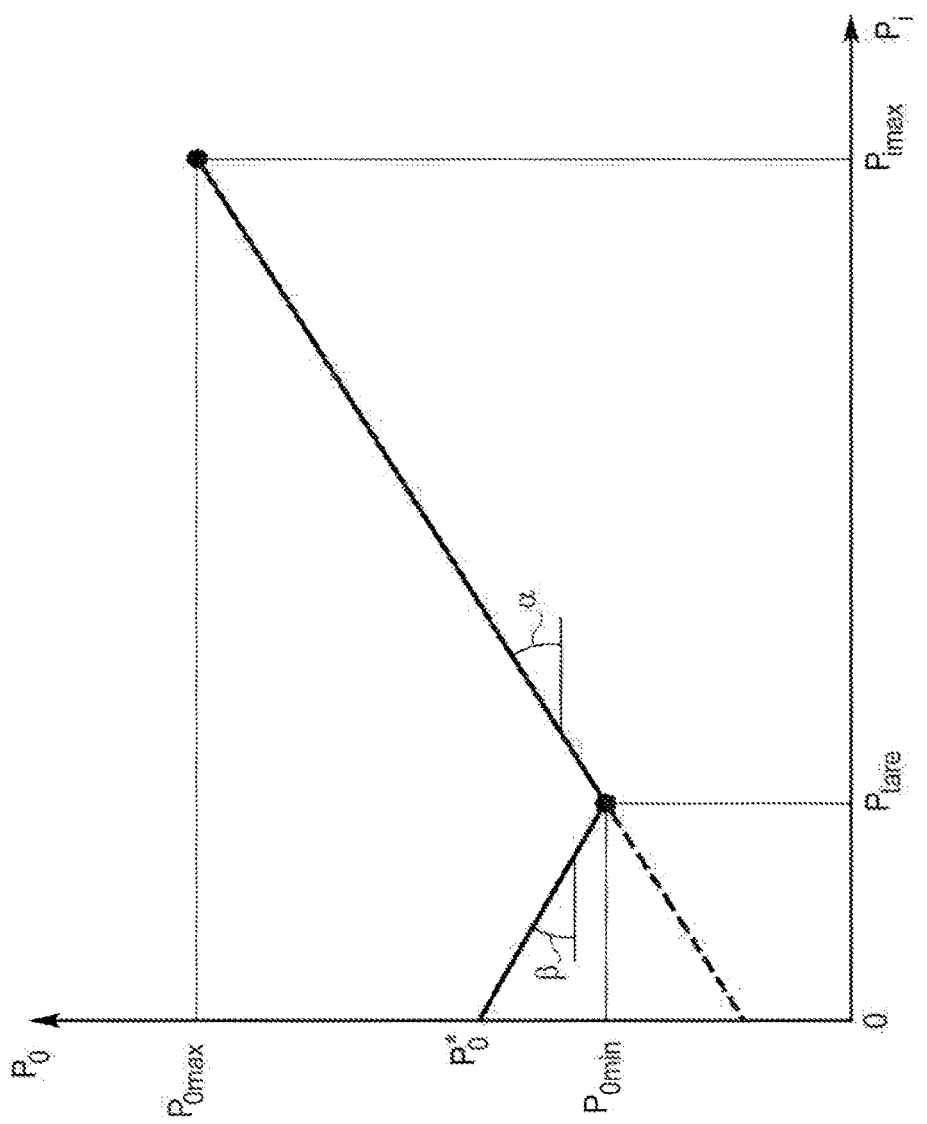
FIG. 2, also described above, shows a characteristic of a valve for controlling the pressure proportionally to the load.
Figure 7:
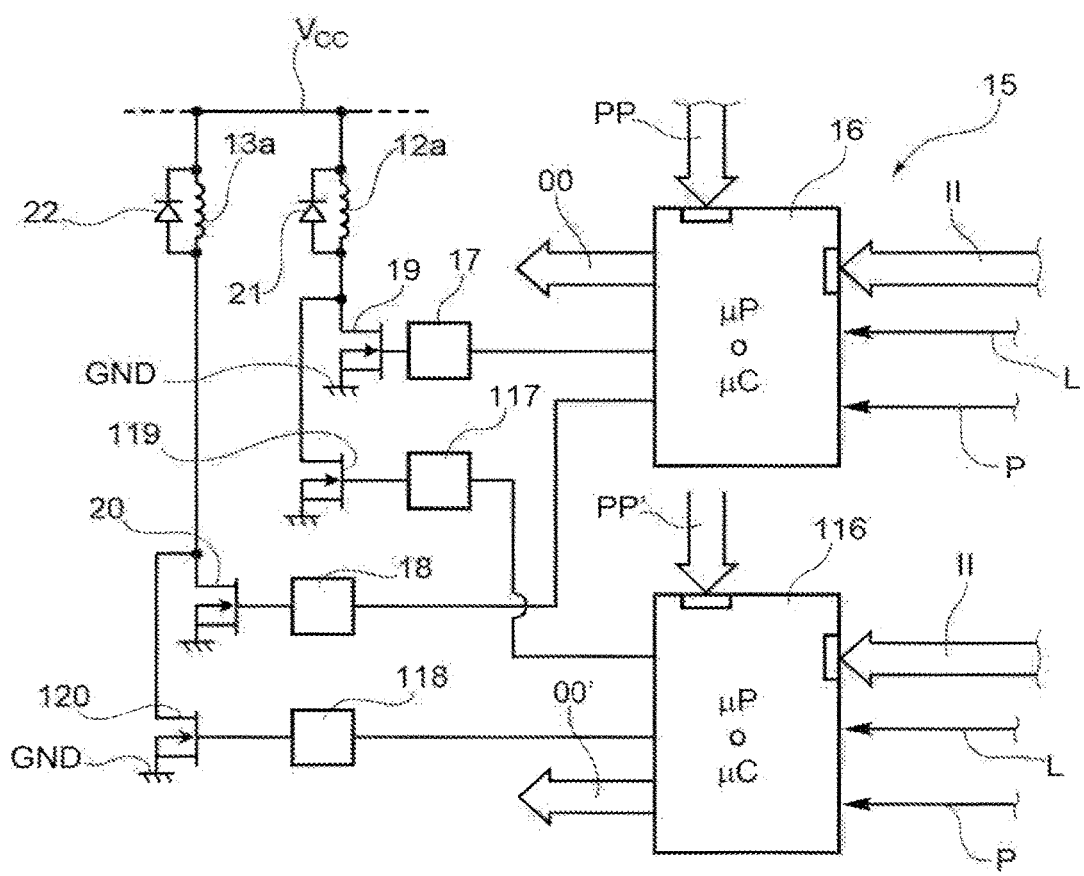
FIGS. 7 to 12 are circuit diagrams, partially in block form, showing various embodiments of a control system for an electro-pneumatic assembly according to one embodiment of the inventive subject matter.

FIG. 7 illustrates one example of a brake control system. This control system can control operation of an electro-pneumatic assembly to execute a pneumatic function on the basis of which a value of pneumatic pressure equal to or greater than a predetermined target, for example according to the characteristic shown in FIG. 2, is produced in the volume or chamber 11 of the assembly according to FIG. 3.

The control system includes two electronic processing and control units 16 and 116, constructed for example in the form of microprocessor or microcontroller units, independent of one another. These units 16, 116 are made, for example, in the form of physical devices which differ from one another, and are designed to execute control strategies which are equivalent to one another, although they are implemented using corresponding software packages which are independent of, and generally different from, one another.

The same input signals L, P and II as those defined above are supplied to the units 16 and 116, together with respective data PP and PP' representing the values of parameters of the respective algorithms implemented in them. The units 16 and 116 also supply respective output signals OO and OO'.

The control unit 16 is designed to drive, through respective bias circuits 17 and 18, the electronic switches 19 and 20 which are essentially connected in series with the respective energizing solenoids 12 *a* and 13 *a* of the solenoid valves 12 and 13. In turn, the electronic unit 116 has two outputs for driving, through bias circuits 117 and 118, corresponding electronic switches 119 and 120, connected, respectively, in parallel with the switches 19 and 20, between a ground reference (e.g., the earth GND or a vehicle chassis) and the energizing solenoids 12 *a* and 13 *a*.

In the diagram according to FIG. 7, the electronic switches 19, 20, 119 and 120 are coupled to one another so as to form together an enabling logic circuit designed to drive the solenoids 12 *a* and 13 *a* in such a way that:

when the logic control signals sent to the switches by the control units 16 and 116 are in agreement with one another, the energizing of the solenoids 12 *a* and 13 *a* of the solenoid valves 12 and 13 enables the pressure in the volume or chamber 11 to be controlled in accordance with Table 1 above, in such a way that the pressure in this volume or chamber 11 conforms (for example) to the characteristic shown in FIG. 2; and conversely, when the logic control signals sent by the units 16 and 116 towards the associated switches 19, 20 and 119, 120 conflict with one another, the logic control signals that are executed are those supplied by the unit 16 or 116 which tends to produce the greater pressure in said volume or chamber 11.

The solenoid 12 *a* (13 *a*) is energized according to a logical OR function of the states of the switches 19 and 119 (20 and 120). With reference to Table 1, a conflict between the signals can occur if one of the two units 16 and 116, using the associated electronic switches, tends to set the condition of pressure decrease in the chamber or volume 11, while the other unit 116 or 16 tends to set the condition of pressure maintenance. As a result of the OR connection between the switches 19 and 119 and between the switches 20 and 120 respectively, the condition of pressure maintenance will prevail. For example, the pressure will not increase or decrease (e.g., by more than a threshold amount, such as 10%).

Similarly, when one of the control units tends to set the condition of pressure increase while the other control unit tends to set the condition of maintenance, then, again as a result of the OR connection between the switches 16 and 119 and between the switches 20 and 120 respectively, the condition of pressure increase will prevail. For example, the pressure will increase (e.g., by at least a threshold amount, such as 10%). Additionally, the condition of pressure increase will also prevail over the condition of pressure decrease. For example, if one signal indicates a pressure increase while another signal indicates a pressure decrease, the pressure increase will occur.

Figure 3:
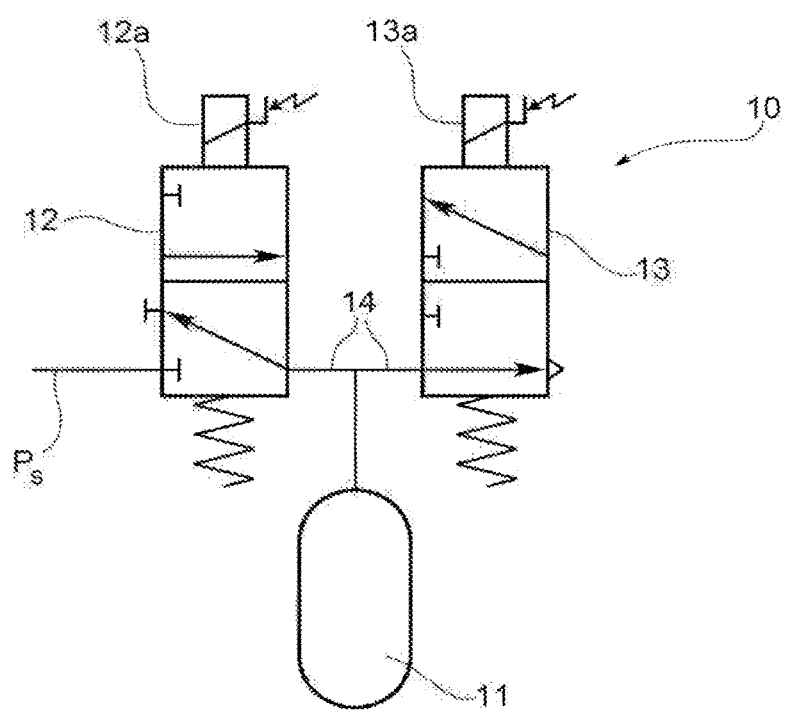
FIGS. 3 to 5 show three different embodiments of a pneumatic part of an electro-pneumatic braking assembly according to one embodiment of the inventive subject matter.

Consequently, the system according to FIG. 7 can be used to execute a pneumatic function adapted to produce, in the volume or chamber 11 of FIG. 3, a value of pressure equal to or greater than a predetermined target value.

Figure 8:
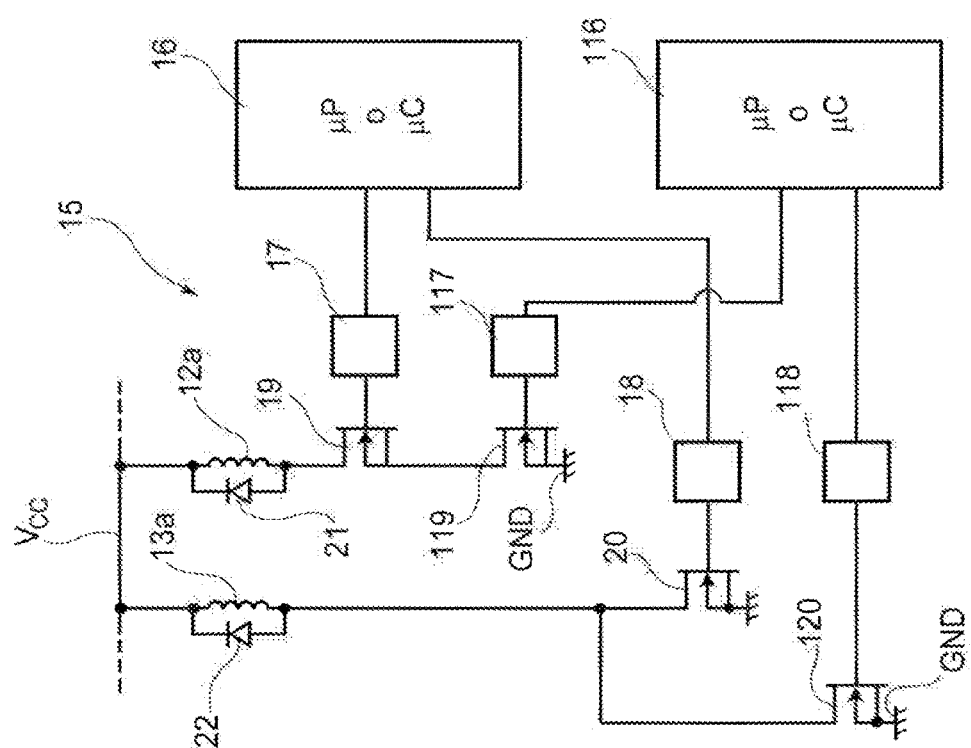

FIG. 8 shows the architecture of a control system for an electro-pneumatic assembly. The diagram of FIG. 8 differs from that of FIG. 7 in that the electronic switches 19 and 119 associated with the solenoids 12 *a* of the solenoid valve 12 of FIG. 4 are connected in series with one another, between this solenoid 12 *a* and the ground reference.

Figure 4:
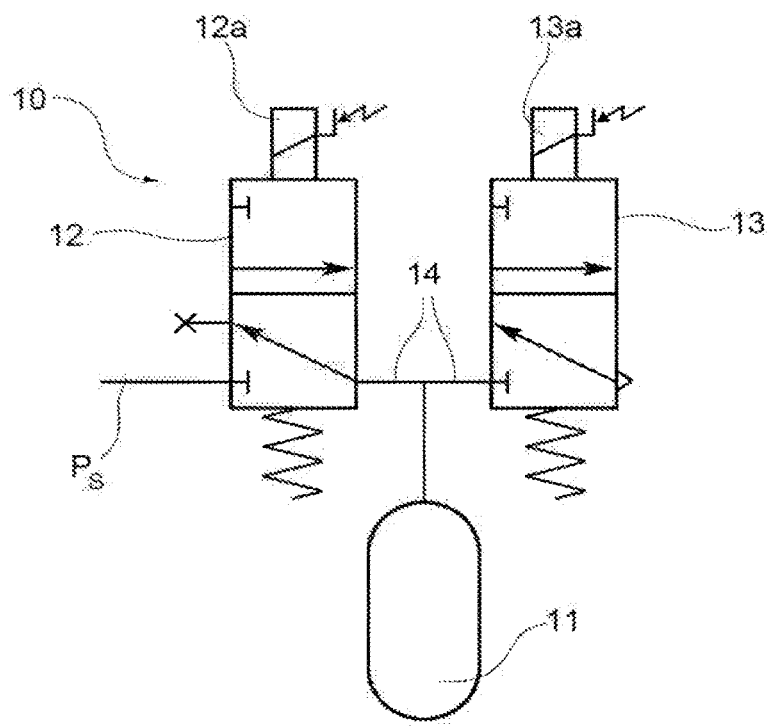

The valve arrangement according to FIG. 4 and the associated control system according to FIG. 8 are such that,
when the logic control signals supplied by the control units 16 and 116 conflict with one another, the logic control signals that are executed are those supplied by the unit 16 or 116 which tends to produce the lower pressure in the volume or chamber 11 (of FIG. 4). This is due to the fact that the solenoid valve arrangement according to FIG. 4 corresponds to Table 2 shown above, and is also due to the logical AND connection of switches 19 and 119 and the logical OR connection of switches 20 and 120.

Thus, with reference to Table 2, it can easily be seen that, if one control unit 16 or 116 tends to set the condition of pressure decrease in the chamber or volume 11 while the other control unit 116 or 16 tends to set the condition of pressure maintenance, then, as a result of the AND connection between the switches 19 and 119, the condition of pressure decrease will prevail. Similarly, when one of the two units 16 and 116 tends to set the condition of pressure increase while the other unit 116 or 16 tends to set the condition of maintenance, then, as a result of the logical OR connection between the switches 20 and 120 and the logical AND connection between the switches 19 and 119, the condition of pressure maintenance will prevail. Finally, the condition of pressure maintenance, commanded by one of the two units, prevails over the condition of pressure increase commanded by the other unit. Consequently, a pneumatic function is executed which is adapted to produce a pressure equal to or less than a predetermined target value in the volume or chamber 11.

The electro-pneumatic assembly can be used to obtain a pneumatic pressure equal to or greater than a predetermined target pressure in the volume or chamber 11. In the diagram according to FIG. 9, both the switches 19 and 119 associated with the solenoid 12 *a* and the switches 20 and 120 associated with the solenoid 13 *a* are coupled to one another according to a logical AND configuration.

Figure 9:
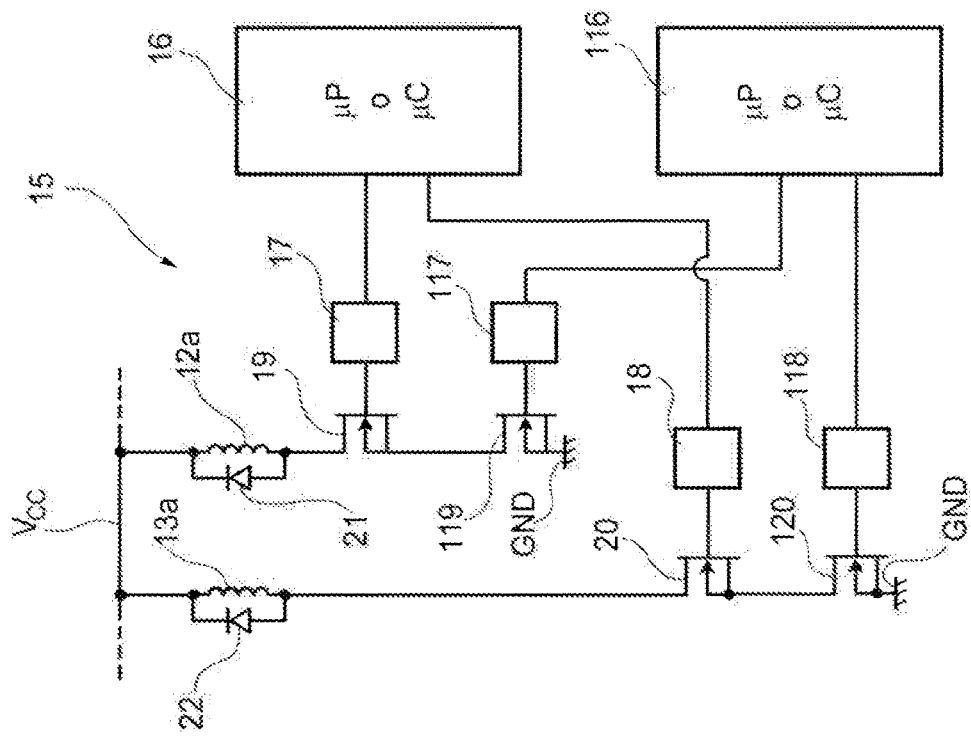
Figure 10:
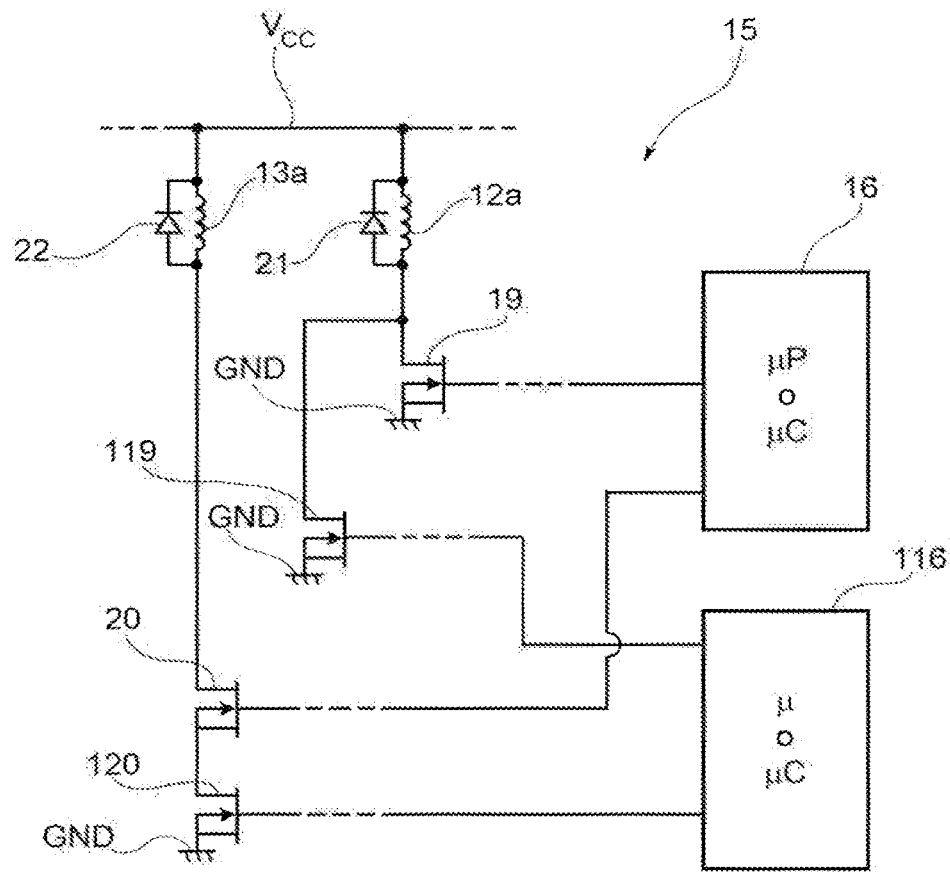

The control system shown in FIG. 10 may differ from the system according to FIG. 9 in that the switches 19 and 119 are coupled to one another according to a logical OR configuration.

An electro-pneumatic assembly of this type can be used to execute a pneumatic function adapted to produce a value of pressure equal to or greater than a predetermined target value in the volume or chamber 11 of FIG. 3.

Figure 5:
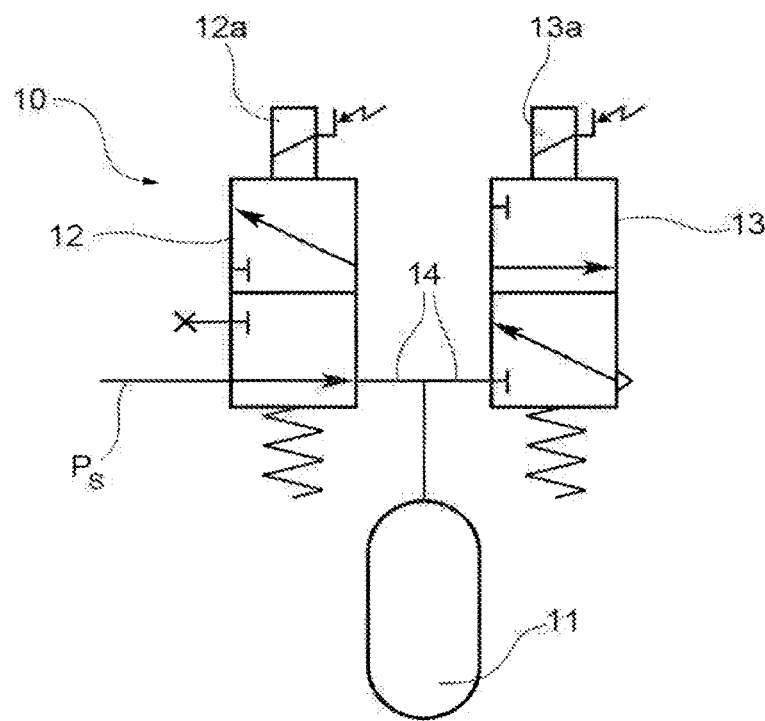
Figure 6:
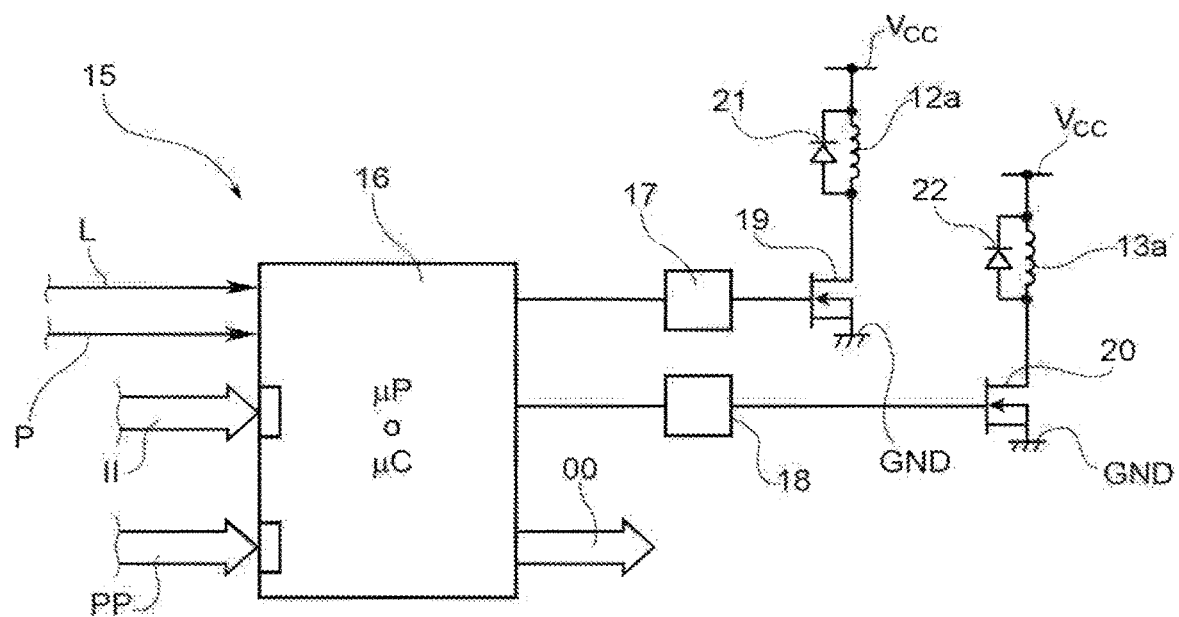
FIG. 6 is a block diagram of a control system for an electro-pneumatic assembly.
Figure 11:
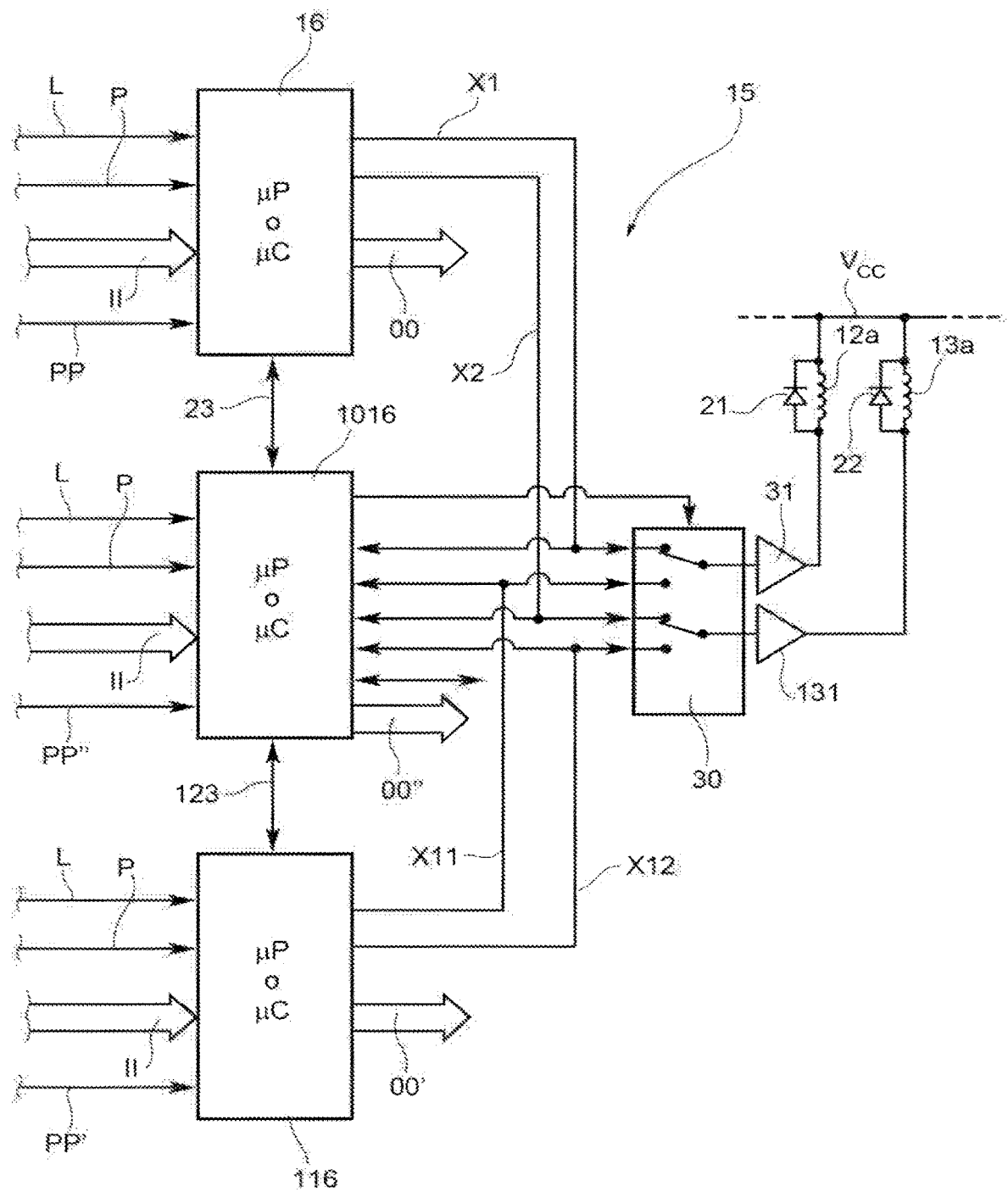

FIG. 11 shows a control system for executing a pneumatic function adapted to produce a value of pressure according to a predetermined transfer function, according to the characteristic shown in FIG. 2 for example, using a solenoid valve part which may conform to any one of FIG. 3, FIG. 4, and FIG. 5. The control system according to FIG. 11 comprises, like the systems described above, two microprocessor or microcontroller control units, indicated by 16 and 116, which receive the signals L, P, II and PP (PP') described above. The unit 16 is designed to supply at its output two logical signals X1, X2, for controlling, respectively, the solenoids 12 and 13 *a* of the solenoid valves 12 and 13. Similarly, the control unit 116 is designed to supply at its output two logic control signals X11, X12, for controlling the solenoids 12 and 13 *a*.

A further microprocessor or microcontroller control unit 1016 based on programmable logics such as FPGA logics also is provided. This unit 1016 receives, as input, the same signals as those arriving at the units 16 and 116, to which the control unit 1016 is connected by respective two-way communication lines 23 and 123.

By executing closed-loop control algorithms such as PID algorithms, "fuzzy" algorithms, or algorithms of the on-off type with hysteresis, otherwise known as bang-bang control algorithms, the control units 16 and 116 can produce, for example, the characteristic according to the diagram of FIG. 2, where the value of the pressure on the horizontal axis Pi is the pressure indicated by the load signals L, and the feedback pressure for the control algorithm is represented by the signal P, corresponding to the pressure Po in the diagram of FIG. 2.

As in the systems according to FIGS. 7 to 10, the electronic units 16 and 116 can execute different programs, derived from two different algorithms. The units 16 and 116 communicate with the unit 1016 through the lines 23 and 123. Such as by signals comprising communication protocols, or alternatively a set of hard-wired handshake signals. Through the lines 23 and 123, the units 16 and 116 communicate respective auto-diagnosis signals to the unit 1016 which is designed to execute diagnostic procedures to verify the correct operation of the units 16 and 116, using a dedicated algorithm.

The unit 1016 controls the state of a switching device 30. This device 30 can be constructed using electromechanical (relay) or solid-state switches, and has two outputs which, via drive circuits 31, 131, control the state of the solenoids 12 $a$ and 13 $a$ of the solenoid valves 12 and 13.

The unit 1016 determines which of the two units 16 and 116 the direct control of the solenoids 12 $a$ and 13 $a$ is to be assigned to initially, by coupling the outputs of the switching device 30 selectively to the outputs X1, X2 of the unit 16 or to the outputs X11 and X12 of the control unit 116. The unit 1016 verifies that the selected control unit is correctly executing the predetermined pneumatic function, for example the function according to the characteristic shown in FIG. 2.

The unit 1016 is also designed to periodically cause the switching of the switching device 30, assigning the control of the solenoids 12 $a$ and 13 $a$ to one and the other of the units 16, 116 in alternate periods, to verify the availability of these units, that is to say to verify that both are capable of executing the control of said solenoids, in case one of these two units proves to be longer capable of controlling said solenoids according to the pneumatic function to be executed.

Figure 12:
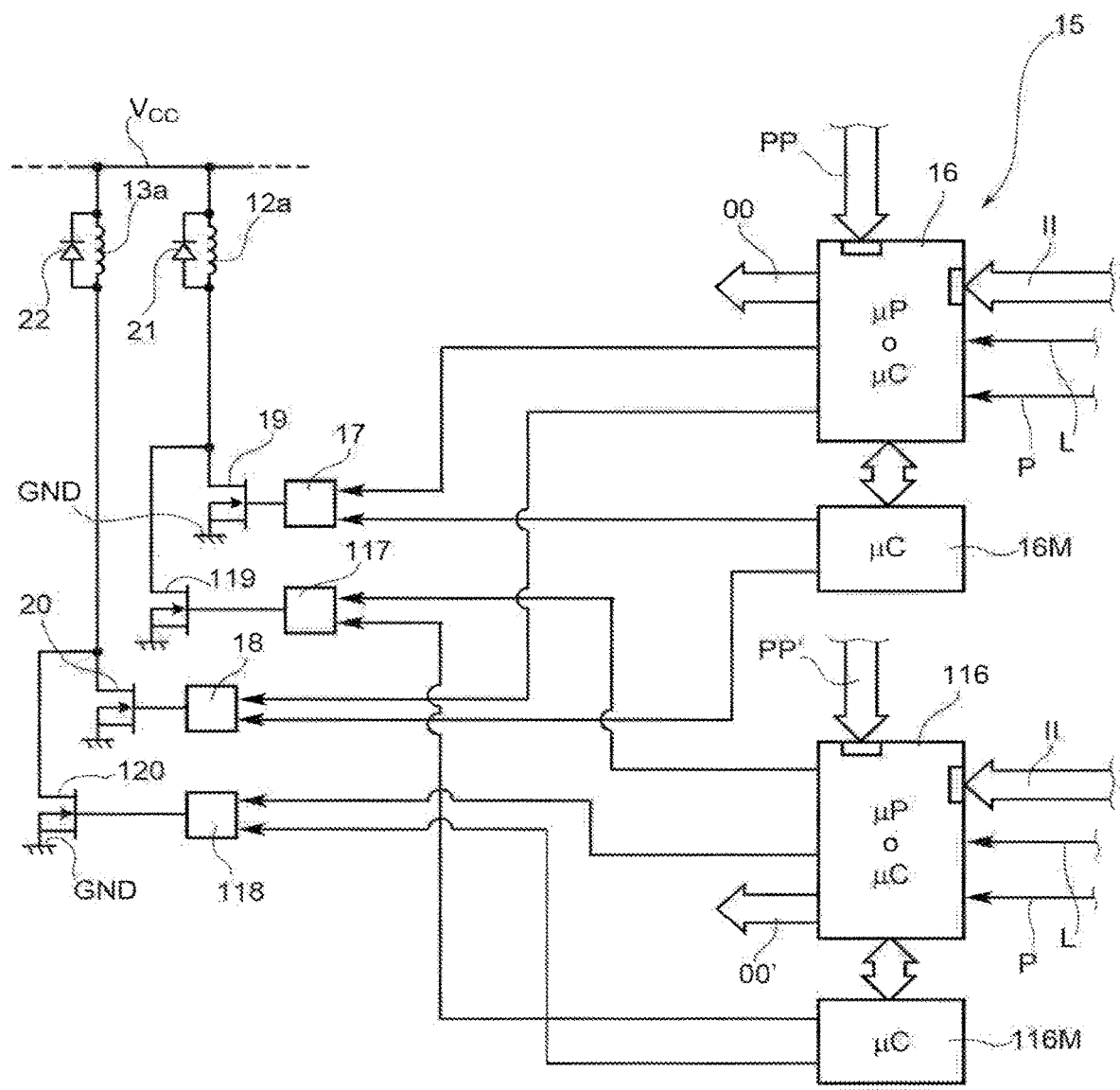

FIG. 12 shows a further embodiment in which the electronic switches 19, 20, 119 and 120 are connected to one another and to the solenoids 12 $a$ and 13 $a$ in the way shown in FIG. 7. However, the embodiment according to FIG. 12 can be implemented not only with the configuration according to FIG. 7, but with any one of the other configurations described above.

In the system according to FIG. 12, the control units 16 and 116 are monitored by respective monitoring and diagnostic devices 16M and 116M, constructed with the use of microcontrollers, for example.

When a monitoring device 16M or 116M detects an operating anomaly or fault in the associated unit 16 or 116, it disables the logic signals sent by the associated unit 16 or 116 to the corresponding switches 19, 20 or 119, 120, for example by adjusting the associated bias circuits 17, 18 or 117, 118.

In these embodiments, the units 16, 116, as well as the monitoring and diagnostic devices 16M, 116M if necessary, can be integrated into a single device, for example a dual core chip or FPGA device.

Figure 13:
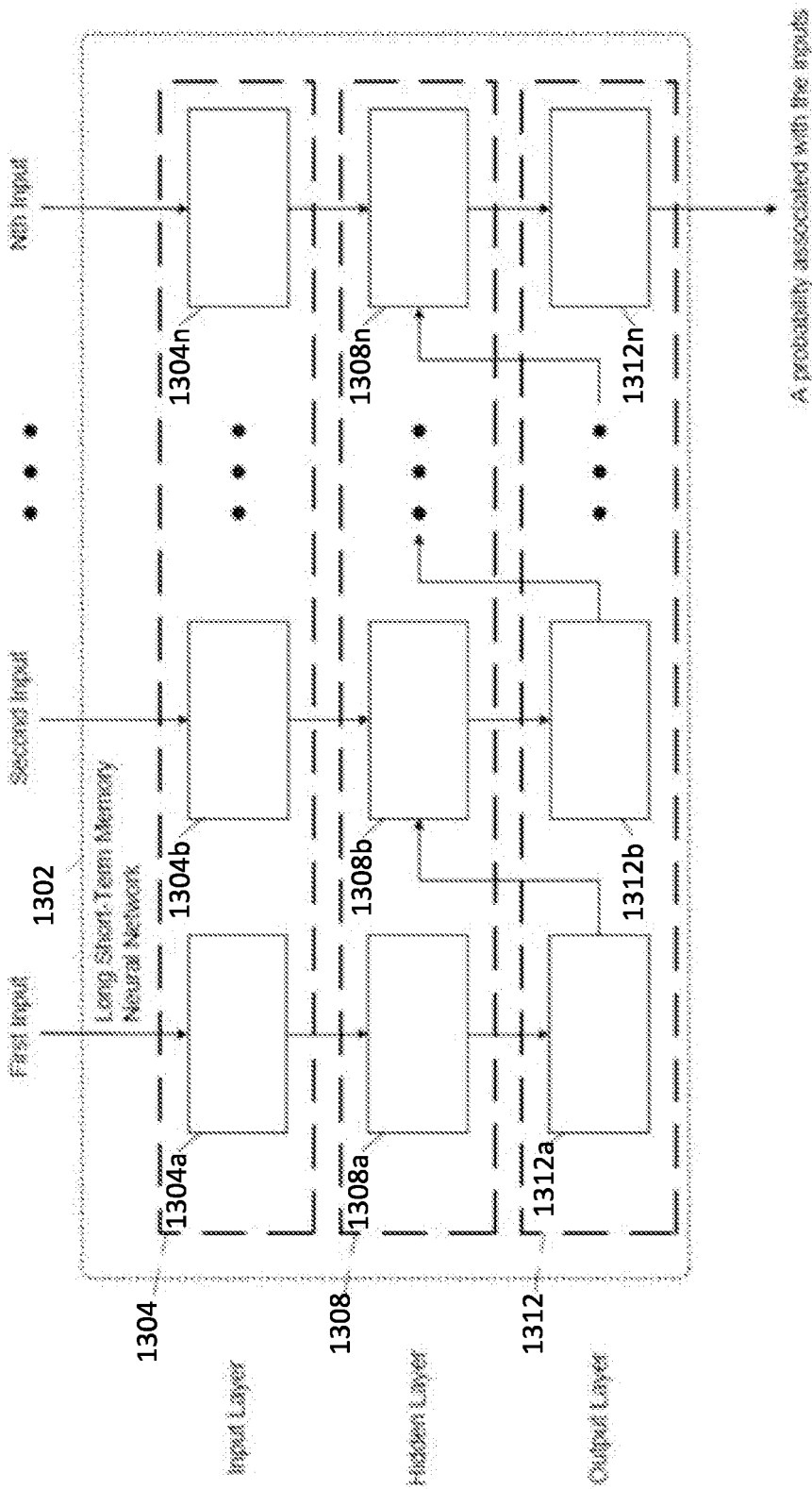
FIG. 13 illustrates a functional block diagram of an example neural network that ca be used by a braking system for vehicles, according to one example.

As previously stated, one or more of the braking systems described herein may be implemented in an AI or machine-learning system. FIG. 13 illustrates a functional block diagram of an example neural network 1302 that can be used by a braking system. The braking system may review various inputs, described above, for example a signal L containing information on the weight of the vehicle, a signal P representing the pneumatic pressure within the volume or chamber, data PP and PP' representing values of parameters of respective algorithms, a signal containing information regarding an operational state of one or more solenoids (e.g., energized, deenergized), a signal containing information regarding an operational state of the one or more switches, or the like. In an example, the neural network 1302 can represent a long short-term memory (LSTM) neural network. In an example, the neural network 1302 can represent one or more recurrent neural networks (RNN). The neural network 1302 may be used to implement the machine learning as described herein, and various implementations may use other types of machine learning networks. The neural network 1302 may include an input layer 1304, one or more intermediate or hidden layers 1308, and an output layer 1312. Each layer 1304, 1308, 1312 includes artificial individual units, or neurons. Each neuron can receive information (e.g., as input into the neural network 1302 or as received as output from another neuron in another layer or the same layer), process this information to generate output, and provide the output to another neuron or as output of the neural network 1302. The input layer 1304 may include several input neurons 1304a, 1304b . . . 1304n. The hidden layer 1308 may include several intermediate neurons 1308a, 1308b . . . 1308n. The output layer 1312 may include several output neurons outputs 1312a, 1312b . . . 1312n. The inputs may include, for example, vehicle weight, pneumatic pressure, switch status, or the like.

Each neuron can receive an input from another neuron and output a value to the corresponding output to another neuron (e.g., in the output layer 1312 or another layer). For example, the intermediate neuron 1308a can receive an input from the input neuron 1304a and output a value to the output neuron 1312a. Each neuron may receive an output of a previous neuron as an input. For example, the intermediate neuron 1308b may receive input from the input neuron 1304b and the output neuron 1312a. The outputs of the neurons may be fed forward to another neuron in the same or different intermediate layer 1308.

The processing performed by the neurons may vary based on the neuron, but can include the application of the various rules or criteria described herein to partially or entirely decide one or more aspects of the braking system, for example when to enable or release pressure in the volume or chamber, when to energize or deenergize the solenoids, when to open or close the one or more switches or the like. The output of the application of the rule or criteria can be passed to another neuron as input to that neuron. One or more neurons in the intermediate and/or output layers 1308, 1312 can determine matches between one or more aspects of the braking system, for example that the weight of the vehicle requires a minimum pressure in the chamber. As used herein, a "match" may refer to a preferred operation of the braking system based on the inputs, for example a preferred pressure in the chamber. The preferred operation may be based on increasing performance, efficiency, safety, longevity, or a combination of any or all of these factors. The last output neuron 1312n in the output layer 1312 may output a match or no-match decision. For example, the output from the neural network 1302 may be an that a solenoid needs to be energized for a given vehicle weight and chamber pressure level. Although the input layer 1304, the intermediate layer(s) 1008, and the output layer 1012 are depicted as each including three artificial neurons, one or more of these layers may contain more or fewer artificial neurons. The neurons can include or apply one or more adjustable parameters, weights, rules, criteria, or the like, as described herein, to perform the processing by that neuron.

In various implementations, the layers of the neural network 1302 may include the same number of artificial neurons as each of the other layers of the neural network 1302. For example, the vehicle weight, pneumatic pressure within the volume or chamber, or the like may be processed to provide information to the input neurons 1304a-1304n. The output of the neural network 1302 may represent a match or no-match of the inputs to the a given output. More specifically, the inputs can include historical vehicle data. The historical vehicle data can be provided to the neurons 1308a-1308n for analysis and matches between the historical vehicle data. The neurons 1308a-1308n, upon finding matches, may provide the potential connections as outputs to the output layer 1312, which can determine a connection, no connection, or a probability of a connection.

In some embodiments, the neural network 1302 may be a convolutional neural network. The convolutional neural network can include an input layer, one or more hidden or intermediate layers, and an output layer. In a convolutional neural network, however, the output layer may include one fewer output neuron than the number of neurons in the intermediate layer(s), and each neuron may be connected to each output neuron. Additionally, each input neuron in the input layer may be connected to each neuron in the hidden or intermediate layer(s).

Such a neural network-based braking system can be trained by operators, automatically self-trained by the braking system itself, or can be trained both by operators and by the braking system itself to improve how the system operates.

In one embodiment, an assembly may include a supply valve that can be disposed between a chamber and a pressure source, a discharge valve that may be disposed between the chamber and an external atmosphere, and a first control unit that can be coupled with the supply valve by a first switch and with the discharge valve by a second switch. The first control unit may output signals to the first switch and the second switch may control the supply valve and the discharge valve. The assembly also may include a second control unit that can be coupled with the discharge valve by a third switch and a fourth switch. The second control unit may output signals to the third switch and the fourth switch to control the supply valve and the discharge valve. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

The supply valve and the discharge valve may increase a pressure in the chamber responsive to the signals from the first control unit conflicting with the signals from the second control unit. The supply valve and the discharge valve may decrease a pressure in the chamber responsive to the signals from the first control unit conflicting with the signals from the second control unit. The second control unit may include a second microcontroller to control the signals of the second control unit using an AI neural network having artificial neurons arranged in layers and connected with each other by connections. The second microcontroller may receive feedback based on the signals that are selected by the artificial neurons and may train the AI neural network by changing one or more of the connections between the artificial neurons in the AI neural network based on the feedback that is received.

The supply valve and the discharge valve may increase a pressure in the chamber responsive to the signals from the first control unit matching the signals from the second control unit.

The supply valve and the discharge valve are configured to decrease a pressure in the chamber responsive to the signals from the first control unit matching the signals from the second control unit.

The supply valve and the discharge valve are coupled with each other in a series.

The supply valve and the discharge valve are configured to be coupled with the chamber with the chamber between the supply valve and the discharge valve.

In one embodiment, an assembly includes a first control unit coupled with a supply valve by a first switch and with a discharge valve by a second switch. The first control unit is configured to output signals to the first switch and the second switch to control the supply valve and the discharge valve to control a pressure inside a chamber. The assembly also includes a second control unit coupled with the discharge valve by a third switch and a fourth switch. The second control unit is configured to output signals to the third switch and the fourth switch to control the supply valve and the discharge valve. The first control unit and the second control unit are configured to output the signals such that the supply valve and the discharge valve open or close based on whether the signals from the first control unit match or conflict with the signals from the second control unit. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

The first control unit and the second control unit are configured to control the supply valve and the discharge valve to increase a pressure in the chamber responsive to the signals from the first control unit conflicting with the signals from the second control unit.

The first control unit and the second control unit are configured to control the supply valve and the discharge valve to decrease a pressure in the chamber responsive to the signals from the first control unit conflicting with the signals from the second control unit.

The second control unit may include a second microcontroller to control the signals of the second control unit using an AI neural network having artificial neurons arranged in layers and connected with each other by connections. The second microcontroller may receive feedback based on the signals that are selected by the artificial neurons and may train the AI neural network by changing one or more of the connections between the artificial neurons in the AI neural network based on the feedback that is received.

The first control unit and the second control unit are configured to control the supply valve and the discharge valve to increase a pressure in the chamber responsive to the signals from the first control unit matching the signals from the second control unit.

The first control unit and the second control unit are configured to control the supply valve and the discharge valve to decrease a pressure in the chamber responsive to the signals from the first control unit matching the signals from the second control unit.

In one embodiment, an assembly includes a supply valve and a discharge valve coupled in series with each other between a pressure source and an external atmosphere. The supply valve and the discharge valve are configured to be coupled with a chamber that is pressurized by the pressure source. The assembly also includes a first control unit coupled with the supply valve by a first switch and with the discharge valve by a second switch. The first control unit is configured to output signals to the first switch and the second switch to control the supply valve and the discharge valve. The assembly also includes a second control unit coupled with the discharge valve by a third switch and a fourth switch. The second control unit is configured to output signals to the third switch and the fourth switch to control the supply valve and the discharge valve. The first control unit may include a first microcontroller to control the signals of the first control unit using an artificial intelligence (AI) neural network having artificial neurons arranged in layers and connected with each other by connections. The first microcontroller may receive feedback based on the signals that are selected by the artificial neurons and may train the AI neural network by changing one or more of the connections between the artificial neurons in the AI neural network based on the feedback that is received.

The supply valve and the discharge valve are configured to increase a pressure in the chamber responsive to the signals from the first control unit conflicting with the signals from the second control unit.

The supply valve and the discharge valve are configured to decrease a pressure in the chamber responsive to the signals from the first control unit conflicting with the signals from the second control unit.

The second control unit may include a second microcontroller to control the signals of the second control unit using an AI neural network having artificial neurons arranged in layers and connected with each other by connections. The second microcontroller may receive feedback based on the signals that are selected by the artificial neurons and may train the AI neural network by changing one or more of the connections between the artificial neurons in the AI neural network based on the feedback that is received.

The supply valve and the discharge valve are configured to increase a pressure in the chamber responsive to the signals from the first control unit matching the signals from the second control unit.

The supply valve and the discharge valve are configured to decrease a pressure in the chamber responsive to the signals from the first control unit matching the signals from the second control unit.

The supply valve and the discharge valve are coupled with each other and with the chamber with the chamber disposed between the supply valve and the discharge valve.

The supply valve may be a solenoid valve.

The discharge valve is another solenoid valve.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may not be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

While one or more embodiments are described in connection with a rail vehicle system, not all embodiments are limited to rail vehicle systems. Unless expressly disclaimed or stated otherwise, the inventive subject matter described herein extends to multiple types of vehicle systems. These vehicle types may include automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

In one embodiment, the control unit may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control unit may include a policy engine that may apply one or more policies. These policies may be based at least in part on characteristics of a given item of equipment or environment. With respect to control policies, a neural network can receive input of a number of environmental and task-related parameters. These parameters may include a vehicle weight, a pneumatic pressure, an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the braking system of the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
a supply valve configured to be disposed between a chamber and a pressure source;
a discharge valve disposed between the chamber and an external atmosphere;
first and second control units that control a pressure in the chamber;
the first control unit being coupled with the supply valve by a first switch and with the discharge valve by a second switch, the first control unit configured to output signals to the first switch and the second switch to control the supply valve and the discharge valve; and
the second control unit being coupled with the discharge valve by a third switch and with the supply valve by a fourth switch, the second control unit configured to output signals to the third switch and the fourth switch to control the supply valve and the discharge valve,
wherein the first control unit includes a first microcontroller configured to control determine the signals output by the first control unit, via using an artificial intelligence (AI) neural network,
the AI neural network having artificial neurons arranged in layers and connected with each other by connections,
the layers including an input layer, one or more intermediate layers and an output layer,
the input layer comprising input neurons configured to receive inputs to the AI neural network, the inputs including a signal representing the pressure in the chamber,
wherein, based on the inputs, one or more neurons in the one or more intermediate layers and/or the output layer are configured to determine a preferred operation and generate an output that relates to the preferred operation and that translates to the signals output by the first control unit,
the first microcontroller configured to:
receive feedback based on the signals that are output by the first control unit, based on the received feedback, provide additional inputs to the AI neural network, and thereby train the AI neural network by changing one or more of the connections between the artificial neurons in the AI neural network.

2. The assembly of claim 1, wherein the second control unit includes a second microcontroller configured to determine the signals output by the second control unit, via using an AI neural network, the AI neural network of the second control unit having artificial neurons arranged in layers and connected with each other by connections, the layers including an input layer, one or more intermediate layers and an output layer, the input layer comprising input neurons configured to receive inputs to the AI neural network of the second control unit, the inputs to the AI neural network of the second control unit including a signal representing the pressure in the chamber, the second microcontroller configured to:

receive feedback based on the signals that are output by the second control unit, based on the received feedback, provide additional inputs to the AI neural network of the second control unit, and thereby train the AI neural network of the second control unit by changing one or more of the connections between the artificial neurons in the AI neural network of the second control unit.

3. The assembly of claim 1, wherein the supply valve and the discharge valve are configured to increase the pressure in the chamber responsive to the signals from the first control unit conflicting with the signals from the second control unit.

4. The assembly of claim 1, wherein the supply valve and the discharge valve are configured to increase the pressure in the chamber responsive to the signals from the first control unit matching the signals from the second control unit.

5. The assembly of claim 1, wherein the supply valve and the discharge valve are configured to decrease the pressure in the chamber responsive to the signals from the first control unit matching the signals from the second control unit.

6. The assembly of claim 1, wherein the supply valve and the discharge valve are coupled with each other in a series.

7. The assembly of claim 6, wherein the supply valve and the discharge valve are configured to be coupled with the chamber with the chamber between the supply valve and the discharge valve.

8. An assembly comprising:

first and second control units that control a pressure in a chamber;

the first control unit being coupled with a supply valve by a first switch and with a discharge valve by a second switch, the first control unit configured to output signals to the first switch and the second switch to control the supply valve and the discharge valve; and the second control unit being coupled with the discharge valve by a third switch and with the supply valve by a fourth switch, the second control unit configured to output signals to the third switch and the fourth switch to control the supply valve and the discharge valve, wherein the first control unit includes a first microcontroller configured to control determine the signals output by the first control unit, via using an artificial intelligence (AI) neural network, the AI neural network having artificial neurons arranged in layers and connected with each other by connections, the layers including an input layer, one or more intermediate layers and an output layer, the input layer comprising input neurons configured to receive inputs to the AI neural network, the inputs including a signal representing the pressure in the chamber, wherein, based on the inputs, one or more neurons in the one or more intermediate layers and/or the output layer are configured to determine a preferred operation and generate an output that relates to the preferred operation and that translates to the signals output by the first control unit, the first microcontroller configured to:

receive feedback based on the signals that are output by the first control unit, based on the received feedback, provide additional inputs to the AI neural network, and thereby train the AI neural network by changing one or more of the connections between the artificial neurons in the AI neural network, wherein the first control unit and the second control unit are configured to output the signals such that the supply valve and the discharge valve open or close based on whether the signals from the first control unit match or conflict with the signals from the second control unit.

9. The assembly of claim 8, wherein the second control unit includes a second microcontroller configured to determine the signals output by the second control unit, via using an AI neural network, the AI neural network of the second control unit having artificial neurons arranged in layers and connected with each other by connections, the layers including an input layer, one or more intermediate layers and an output layer, the input layer comprising input neurons configured to receive inputs to the AI neural network of the second control unit, the inputs to the AI neural network of the second control unit including a signal representing the pressure in the chamber, the second microcontroller configured to:

receive feedback based on the signals that are output by the second control unit, based on the received feedback, provide additional inputs to the AI neural network of the second control unit, and thereby train the AI neural network of the second control unit by changing one or more of the connections between the artificial neurons in the AI neural network of the second control unit.

10. The assembly of claim 8, wherein the first control unit and the second control unit are configured to control the supply valve and the discharge valve to increase the pressure in the chamber responsive to the signals from the first control unit conflicting with the signals from the second control unit.

11. The assembly of claim 8, wherein the first control unit and the second control unit are configured to control the supply valve and the discharge valve to increase the pressure in the chamber responsive to the signals from the first control unit matching the signals from the second control unit.

12. The assembly of claim 8, wherein the first control unit and the second control unit are configured to control the supply valve and the discharge valve to decrease the pressure in the chamber responsive to the signals from the first control unit matching the signals from the second control unit.

13. An assembly comprising:
a supply valve and a discharge valve coupled in series with each other between a pressure source and an external atmosphere, the supply valve and the discharge valve configured to be coupled with a chamber that is pressurized by the pressure source;
first and second control units that control a pressure in the chamber;
the first control unit being coupled with the supply valve by a first switch and with the discharge valve by a second switch, the first control unit configured to output signals to the first switch and the second switch to control the supply valve and the discharge valve; and
the second control unit being coupled with the discharge valve by a third switch and with the supply valve by a fourth switch, the second control unit configured to output signals to the third switch and the fourth switch to control the supply valve and the discharge valve,
wherein the first control unit includes a first microcontroller configured to control determine the signals output by the first control unit, via using an artificial intelligence (AI) neural network,
the AI neural network having artificial neurons arranged in layers and connected with each other by connections,
the layers including an input layer, one or more intermediate layers and an output layer,
the input layer comprising input neurons configured to receive inputs to the AI neural network, the inputs including a signal representing the pressure in the chamber,
wherein, based on the inputs, one or more neurons in the one or more intermediate layers and/or the output layer are configured to determine a preferred operation and generate an output that relates to the preferred operation and that translates to the signals output by the first control unit,
the first microcontroller configured to:
receive feedback based on the signals that are output by the first control unit,
based on the received feedback, provide additional inputs to the AI neural network, and
thereby train the AI neural network by changing one or more of the connections between the artificial neurons in the AI neural network.

14. The assembly of claim 13, wherein the second control unit includes a second microcontroller configured to determine the signals output by the second control unit, via using an AI neural network,
the AI neural network of the second control unit having artificial neurons arranged in layers and connected with each other by connections,
the layers including an input layer, one or more intermediate layers and an output layer,
the input layer comprising input neurons configured to receive inputs to the AI neural network of the second control unit,
the inputs to the AI neural network of the second control unit including a signal representing the pressure in the chamber,
the second microcontroller configured to:
receive feedback based on the signals that are output by the second control unit,
based on the received feedback, provide additional inputs to the AI neural network of the second control unit, and
thereby train the AI neural network of the second control unit by changing one or more of the connections between the artificial neurons in the AI neural network of the second control unit.

15. The assembly of claim 13, wherein the supply valve and the discharge valve are configured to increase the pressure in the chamber responsive to the signals from the first control unit conflicting with the signals from the second control unit.

16. The assembly of claim 13, wherein the supply valve and the discharge valve are configured to increase the pressure in the chamber responsive to the signals from the first control unit matching the signals from the second control unit.

17. The assembly of claim 13, wherein the supply valve and the discharge valve are configured to decrease the pressure in the chamber responsive to the signals from the first control unit matching the signals from the second control unit.

18. The assembly of claim 13, wherein the supply valve and the discharge valve are coupled with each other and with the chamber with the chamber disposed between the supply valve and the discharge valve.

19. The assembly of claim 13, wherein the supply valve is a first solenoid valve.

20. The assembly of claim 19, wherein the discharge valve is a second solenoid valve.

* * * * *